Figure 1:
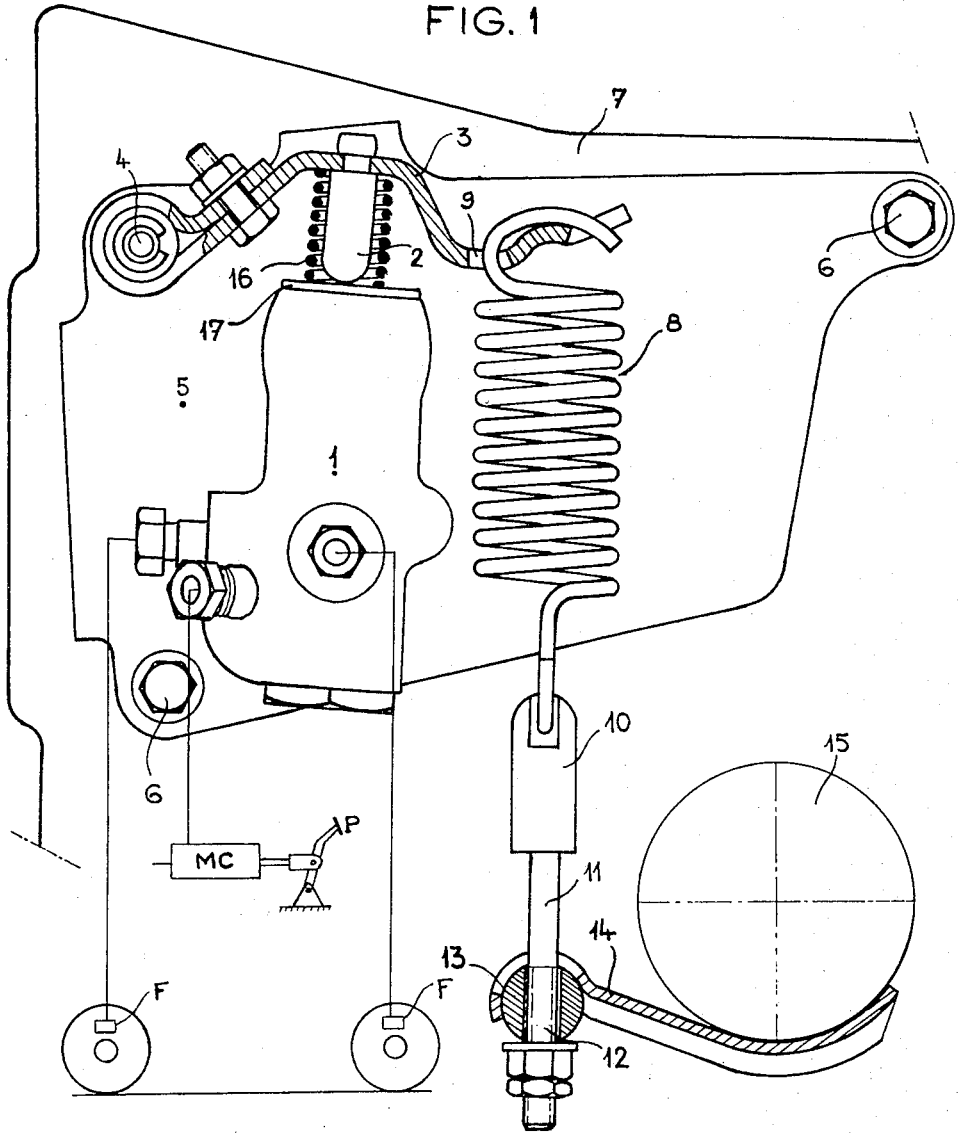

United States Patent
Guettier

[15] 3,695,735
[45] Oct. 3, 1972

[54] BRAKING PRESSURE CORRECTING VALVE CONTROL DEVICES

[72] Inventor: Michel Guettier, Billancourt, France

[73] Assignee: Regie Nationale des Usines Renault, Billancourt, France

[22] Filed: May 18, 1970

[21] Appl. No.: 38,307

[30] Foreign Application Priority Data

June 4, 1969 France.....................6918314

[52] U.S. Cl................................303/22 R, 188/195
[51] Int. Cl. ................................................B60t 8/22
[58] Field of Search.........188/195, 349; 303/22, 6 C; 180/100–102

[56] References Cited

UNITED STATES PATENTS

| | | |
|---|---|---|
| 3,506,313 | 4/1970 | Lawson..................188/195 X |
| 3,503,657 | 3/1970 | MacDuff..................303/22 R |
| 3,362,758 | 1/1968 | Goerke et al. ...........303/22 R |
| 3,285,673 | 11/1966 | Dobrikin..................303/22 R |
| 3,512,845 | 5/1970 | Farmery et al.........188/195 X |

Primary Examiner—Milton Buchler
Assistant Examiner—Stephen G. Kunin
Attorney—Stevens, Davis, Miller & Mosher

[57] ABSTRACT

A device for controlling a braking pressure correcting valve which comprises a movable member such as a piston, the position of which determines the operating characteristics of the braking pressure correcting valve, and the device includes such a valve mounted between a sprung portion and an unsprung portion of a vehicle and includes a resilient member and a push member cooperatively acting with a movable piston wherein the resilient member exerts a permanent force against the piston and the push member exerts only a temporary force against the piston.

5 Claims, 2 Drawing Figures

BRAKING PRESSURE CORRECTING VALVE CONTROL DEVICES

This invention relates to a device for controlling the correcting valve utilized in motor vehicles for adjusting the braking pressure, such as a pressure distributor or limiter, and is concerned more particularly with a device adapted to prevent an accidental or undesired modification in the operating characteristics of said valve.

In automotive vehicles frequently subjected to substantial changes or discrepancies in the load distribution, such as passenger vehicles and certain utility vehicles likely to be operated either under no-load conditions or under full-load or partial load conditions, the load being supported mainly by the rear axle, it is now current practice to provide a braking pressure corrector adapted to distribute or apportion or limit the braking pressure as a function of the load carried by this axle.

Devices for controlling braking pressure correctors are already known wherein a resilient member such as a spring attached at one end to a suitable member of the suspension system and at the other end directly or indirectly to the corrector is used.

This now very popular control system permits the accidental expansion of the resilient member connected to the suspension element when this element (mainly a wheel suspension or carrier arm) is caused to abut against the vehicle body or chassis for example when negotiating a turn or driving on an uneven road surface.

The accidental expansion of the resilient member is generally attended by a displacement of the anchor points of this member and this constitutes a source of undesired parasitic noise.

If, during the effort resulting from a brake application, the wheel or axle controlling the braking pressure corrector is momentarily unloaded, it is possible that the correcting valve be closed at a very low pressure before the rear brakes are operated. In this case the driver will have the unpleasant feeling of a change having occurred in the brake pedal stroke and also of a sudden drop in the braking efficiency.

It is the essential object of the present invention to avoid the inconveniences mentioned hereinabove by providing a device for controlling a braking pressure corrective valve comprising a movable member the position of which determines the operating characteristics of said valve, this device comprising means for mounting the valve to one portion of the vehicle and control means interposed between a sprung portion and an unsprung portion of the vehicle, and being characterized essentially in that said control means comprise a resilient member and a push member co-acting in a manner already known per se with the movable piston member of said valve so that the resilient member exerts a permanent effort on said piston and said push member exerts a temporary effort on said piston.

Figure 2:
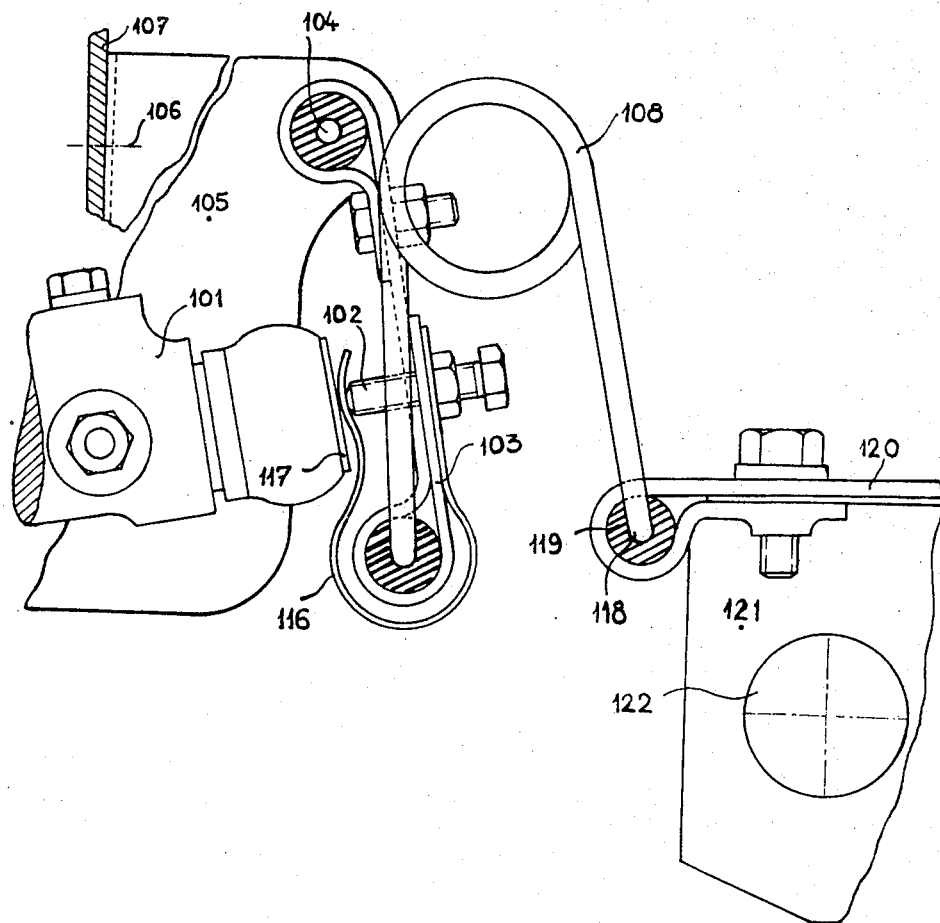

Other features and advantages characterizing this invention will now be described more in detail with reference to the attached drawing illustrating diagrammatically by way of example two typical forms of embodiment of this control device. In the drawing:

FIG. 1 is a side elevational view of the device, with circuit elements shown only very diagrammatically, and FIG. 2 is a similar view of a modified form of embodiment of this device.

Referring first to FIG. 1, the valve 1 receives the information corresponding to the load supported by the rear axle of the vehicle in the form of a thrust exerted by the push member 2 rigid with a lever 3.

The internal construction of this valve and the manner in which this valve is operatively connected to the master cylinder MC actuated by means of the brake pedal P and to the rear wheel brakes F are no part of the present invention and therefore their detailed description is not deemed necessary herein, since anybody conversant with the art will readily understand that this invention is applicable to various valve types the operation of which is not attended by any particular connection or mounting problem.

The lever 3 is fulcrumed to a pivot pin 4 carried by the valve support or bracket 5. The latter is secured by means of screws 6 to a member 7 of the vehicle body or chassis. A gauged spring 8 having one end engaged through a hole 9 formed in the free end of lever 3 has its opposite end 10 provided a with a rod extension 11 formed with a screw-threaded portion 12. This rod 11 extends through a ball-joint 13 and supports with the assistance of a nut and lock nut a lever 14 pivoting about said ball joint 13 as illustrated. This lever 14 is shaped to support the shaft 15 of the wheel suspension arm. According to this invention, a resilient member such as a prestressed compensation spring 16 surrounds the push member 2 so as to exert a constant pressure against the movable member 17 of valve 1.

In FIG. 2 a modified form of embodiment of the control device is shown, wherein the component elements having the same functions as those shown in FIG. 1 are designated by the same reference numeral plus 100 (thus, for instance, the spring 8 of FIG. 1 corresponds to the spring 108 of FIG. 2).

In FIG. 2, the ends of the gauged spring 108 subjected to the flexure stresses caused by the wheel suspension movements or beats are moved towards each other during these movements. The end 118 of this spring engages a socket 119 of suitable elastomeric material which is secured by means of a strap 120 to the swinging arm 121 of the suspension system. This arm 121 (of which the position depends on the load supported by the rear axle of the vehicle) is pivotally mounted to a shaft 122.

This device operates as follows:

When the spring 8 (108) is tensioned, the compensation spring 16 (116) is compressed. Push member 2 (102) thus actuates the movable member 17 (117) of valve 1 (101).

When spring 8 (108) is expanded, push member 2 (102) moves away from the valve control face. In this case the effort resulting from the expansion of compensation spring 16 (116) will balance the action of spring 8 (108).

An advantageous feature characterizing this arrangement comprising a compensation spring lies in the fact that its characteristics are inoperative during the normal operation of the control device.

Therefore, the function of the compensation spring consists:

in maintaining all the control parts somewhat prestressed, thus avoiding undesired noise and the "-hammering" of parts;

in constantly maintaining a minimum valve cut-off pressure irrespective of the position of the wheel suspension arm during a brake application.

Although this invention has been described with reference to specific details of certain embodiments thereof, it is not intended that such details shall be regarded as limitations upon the scope of the invention except insofar as included in the accompanying claims.

What is claimed as new is:

1. A device for controlling a braking pressure correcting valve comprising a valve which comprises a movable member, the position of said movable member determining the operating characteristics of said valve, means for mounting said valve on one portion of a vehicle which comprises sprung and unsprung portions, control means comprising a push member engageable with but not attached to the movable member of said valve, and yielding means engaging said movable member and said push member and constantly biasing said push member in a direction away from said movable member, and a biasing means resiliently linking said push member with the other portion of said vehicle, said biasing means for exerting force on said movable member through said push member when said other portion of said vehicle exerts a strain on said biasing means thereby exerting a stress on said yielding means.

2. The device of claim 1, wherein said movable member in said valve comprises a piston and said yielding means comprises a compression spring engaging said piston and said push member.

3. The device of claim 2, wherein said compression spring comprises a coil spring, and said biasing means comprises a second coil spring linking said push member and the other portion of a vehicle.

4. The device of claim 2, wherein said compression spring comprises a torsion spring, and said biasing means comprises a second torsion spring resiliently linking said push member and the other portion of a vehicle.

5. The device of claim 1, wherein said push member is mounted on a lever arm which is pivotally attached to said mounting means, and said biasing means resiliently links said lever arm with the other portion of a vehicle.

* * * * *